(12) United States Patent
Yoshida et al.

(10) Patent No.: US 8,180,199 B2
(45) Date of Patent: May 15, 2012

(54) PLAYBACK APPARATUS, PLAYBACK METHOD, PROGRAM FOR PLAYBACK METHOD, AND RECORDING MEDIUM RECORDED WITH PROGRAM FOR PLAYBACK METHOD THEREON

(75) Inventors: Haruo Yoshida, Kanagawa (JP); Shigeru Kashiwagi, Tokyo (JP); Masaharu Murakami, Tokyo (JP); Masayoshi Ohno, Tokyo (JP)

(73) Assignee: Sony Corporation, Tokyo (JP)

( * ) Notice: Subject to any disclaimer, the term of this patent is extended or adjusted under 35 U.S.C. 154(b) by 1624 days.

(21) Appl. No.: 11/483,568

(22) Filed: Jul. 11, 2006

(65) Prior Publication Data
US 2007/0036522 A1 Feb. 15, 2007

(30) Foreign Application Priority Data
Jul. 13, 2005 (JP) ................................. 2005-203964

(51) Int. Cl.
*H04N 5/928* (2006.01)
*H04N 5/78* (2006.01)
*H04N 5/765* (2006.01)
*H04N 5/783* (2006.01)
*G06F 12/00* (2006.01)
*G06F 13/00* (2006.01)
*G09B 9/00* (2006.01)

(52) U.S. Cl. ........ 386/338; 386/232; 386/324; 386/345; 348/124; 710/240; 711/149; 711/151; 725/46; 725/61

(58) Field of Classification Search .......... 386/96, 386/95, 111, 131, E5.001, E9.013; 348/124, 348/E5.105, E5.108; 375/E7.006; 710/240; 711/149, 151; 707/999.001, 999.002, 999.005, 707/999.006, 999.01, 999.104, E17.009; 709/223, 231, 236; 715/723; 725/46, 61; G9B/20.009, 20.033, 27.012, 27.013, 27.017, G9B/27.019, 27.02, 27.021, 27.051, 27.052
See application file for complete search history.

(56) References Cited

U.S. PATENT DOCUMENTS
4,821,177 A * 4/1989 Koegel et al. ................ 711/149
(Continued)

FOREIGN PATENT DOCUMENTS
JP 04-221489 8/1992
(Continued)

OTHER PUBLICATIONS
Office Action mailed Dec. 6, 2011 from the Japanese Patent Office in counterpart Japanese Application No. 2010-209209 (3 pages).

*Primary Examiner* — Thai Tran
*Assistant Examiner* — Syed Y Hasan
(74) *Attorney, Agent, or Firm* — Finnegan, Henderson, Farabow, Garrett & Dunner LLP

(57) ABSTRACT

A playback apparatus which plays back video or music contents, includes: a playback unit playing back the video or music contents recorded on a recording medium; an output unit outputting the video or music contents played back in the playback unit; and a control unit controlling at least an operation of the playback unit, wherein in the video or music contents, a quick reference mark is set at multiple places, in response to user manipulation, the control unit finds a start of a sequence in accordance with the quick reference mark to control the operation of the playback unit to play back the video or music contents, in response to user manipulation for the quick reference, the control unit varies a priority that expresses a degree served for the quick reference, and for the mark having a low priority, the control unit accepts no user manipulation for quick reference.

9 Claims, 6 Drawing Sheets

U.S. PATENT DOCUMENTS

| | | | |
|---|---|---|---|
| 6,236,395 B1 * | 5/2001 | Sezan et al. | 715/723 |
| 6,557,042 B1 * | 4/2003 | He et al. | 709/231 |
| 2001/0012444 A1 * | 8/2001 | Ito et al. | 386/111 |
| 2002/0110370 A1 * | 8/2002 | Nomura | 386/111 |
| 2002/0159760 A1 * | 10/2002 | Karasudani et al. | 386/95 |

FOREIGN PATENT DOCUMENTS

| | | |
|---|---|---|
| JP | 08-292965 | 11/1996 |
| JP | 09-219819 | 8/1997 |
| JP | 11-066088 | 3/1999 |
| JP | 2000-308008 | 11/2000 |
| JP | 2000-350165 | 12/2000 |
| JP | 2002-44586 | 2/2002 |
| JP | 2002-073093 | 3/2002 |
| JP | 2002-269951 | 9/2002 |
| JP | 2003-153139 | 5/2003 |
| JP | 2003-216653 | 7/2003 |
| JP | 2004-288245 | 10/2004 |
| JP | 2004-350148 | 12/2004 |

* cited by examiner

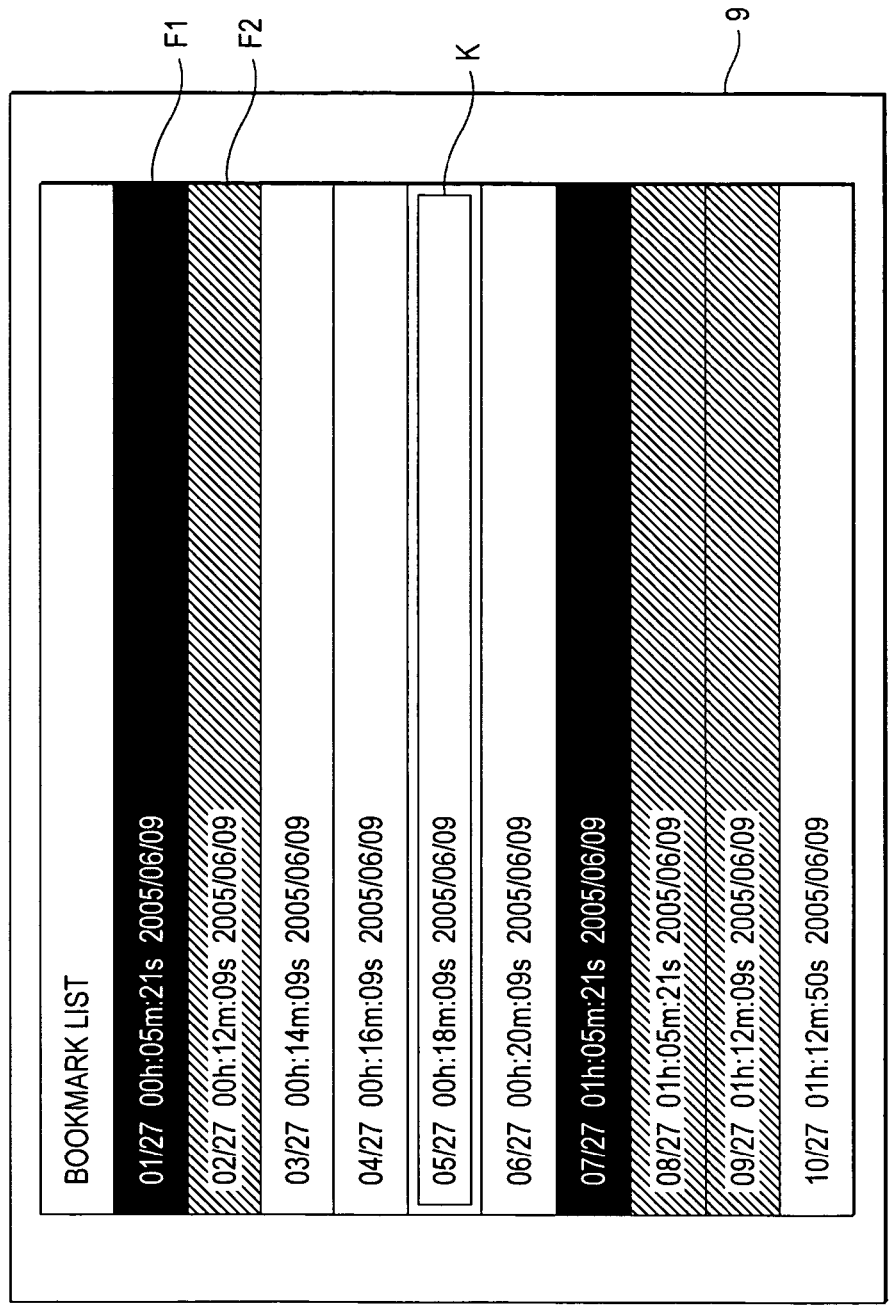

PLAYBACK APPARATUS, PLAYBACK METHOD, PROGRAM FOR PLAYBACK METHOD, AND RECORDING MEDIUM RECORDED WITH PROGRAM FOR PLAYBACK METHOD THEREON

CROSS REFERENCES TO RELATED APPLICATIONS

The present invention contains subject matter related to Japanese Patent Application JP 2005-203964 filed in the Japanese Patent Office on Jul. 13, 2005, the entire contents of which being incorporated herein by reference.

BACKGROUND OF THE INVENTION

1. Field of the Invention

The present invention relates to a playback apparatus, a playback method, a program for a playback method, and a recording medium recorded with a program for a playback method thereon. For example, the invention can be adapted to a recording/playback apparatus which records and plays back a piece of programming of television broadcasting by using an optical disc. The invention improves usability more than before with regard to a mark for quick reference and playback by a bookmark, a chapter, and so on, in which a mark for quick reference such as a bookmark and a chapter is provided with priorities and updated and a user manipulation is not accepted for a mark having a low priority.

2. Description of the Related Art

Heretofore, in a recording/playback apparatus using an optical disc and a hard drive, functions of bookmarks and chapters are provided, and the apparatus is configured to improve user usability by these functions.

More specifically, for example, when video contents of television broadcasting are recorded and played back, this type of recording/playback apparatus sets a bookmark as a mark for quick reference by user manipulation. In addition, when a predetermined operator is manipulated by a user in playing a recorded piece of programming, the apparatus jumps a playback part to the subsequent bookmark or the previous bookmark.

In setting bookmarks in this manner, a method is proposed in which a bookmark is automatically set in recording a piece of programming by settings of detecting a scene change, a constant time interval, and so on. For example, JP-A-9-219819 proposes a method of setting a bookmark by using an electronic program guide.

In a DVD which is a so-called package medium and a playback only recording medium, video contents are offered with chapters set as marks for quick reference. Thus, in a recording/playback apparatus of playing back a DVD, the scenes having chapter are displayed in a list, the video contents are played back from the scene selected by a user, and a predetermined operator manipulation jumps the playback part to the subsequent chapter or the previous chapter.

However, for a mark for quick reference and playback by the bookmark or the chapter in these manners, there are unsolved problems in practical use with regard to usability.

More specifically, when a bookmark is set by user manipulation, a user is forced to do a manipulation to set a bookmark, which deteriorates usability. On the other hand, when a bookmark is automatically set, it is eliminated to force a user to do a manipulation to set a bookmark, but bookmarks undesirable for the user are set as well, which might deteriorate usability. In this connection, in automatic bookmark setting in this manner, when it is intended not to set bookmarks undesirable for the user, a bookmark may not be set at a place where the user needs.

The same thing can be said for the chapter as well. When chapters are set to all the scenes that many users want, for certain users, undesirable chapters are set, which rather deteriorates usability. In this case, when the number of chapters is decreased, desired chapters for certain users are not set this time.

Patent Reference 1: JP-A-9-219819

SUMMARY OF THE INVENTION

The invention has been made in view of the circumstances. It is desirable to provide a playback apparatus, a playback method, a program for a playback method, and a recording medium recorded with a program for a playback method thereon, which can improve usability more than before with regard to a mark for quick reference and playback by a bookmark, a chapter, etc.

An embodiment of the invention is adapted to a playback apparatus which plays back video contents or music contents, the playback apparatus including: a playback unit which plays back the video contents or the music contents recorded on a recording medium; an output unit which outputs the video contents or the music contents played back in the playback unit; and a control unit which controls at least an operation of the playback unit, wherein in the video contents or the music contents, a mark for quick reference is set at a plurality of places, in response to a manipulation done by a user, the control unit finds a start of a sequence in accordance with the mark for quick reference to control the operation of the playback unit so as to play back the video contents or the music contents, in response to a manipulation done by the user with regard to the quick reference, the control unit varies a priority that expresses a degree served for the quick reference, and for the mark having a low priority, the control unit does not accept a quick reference manipulation done by the user.

In addition, an embodiment of the invention is adapted to a playback method of video contents or music contents in which the video contents or the music contents have a mark for quick reference that is set at a plurality of places, the playback method including the steps of: a content playback step which finds a start of a sequence in accordance with the mark for quick reference and plays back the video contents or the music contents in response to a manipulation done by a user, and a priority varying step which varies a priority that expresses a degree served for the quick reference in response to a manipulation done by the user with regard to the quick reference, wherein in the content playback step, a quick reference manipulation done by the user is not accepted for the mark having a low priority.

In addition, an embodiment of the invention is adapted to a program for a playback method which plays back video contents or music contents by running process procedures done by an operating processing module, wherein the video contents or the music contents have a mark for quick reference that is set at a plurality of places, and the process procedures include the steps of: a content playback step which finds a start of a sequence in accordance with the mark for quick reference and plays back the video contents or the music contents in response to a manipulation done by a user, and a priority varying step which varies a priority that expresses a degree served for the quick reference in response to a manipulation done by the user with regard to the quick reference, wherein in the content playback step, a quick reference manipulation done by the user is not accepted for the mark having a low priority.

In addition, an embodiment of the invention is a recording medium recorded with a program for the playback method according an embodiment of the invention thereon.

According to the configuration of an embodiment of the invention, it is adapted to a playback apparatus which plays back video contents or music contents, which including: a playback unit which plays back the video contents or the music contents recorded on a recording medium; an output unit which outputs the video contents or the music contents played back in the playback unit; and a control unit which controls at least an operation of the playback unit, wherein in the video contents or the music contents, a mark for quick reference is set at a plurality of places, in response to a manipulation done by a user, the control unit finds a start of a sequence in accordance with the mark for quick reference to control the operation of the playback unit so as to play back the video contents or the music contents, in response to a manipulation done by the user with regard to the quick reference, the control unit varies a priority that expresses a degree served for the quick reference, and for the mark having a low priority, the control unit does not accept a quick reference manipulation done by the user. When this is done, even though a number of marks for quick reference are set as they are available for all users, the priority is increased in desired marks to accept a manipulation. Finally, quick reference and playback can be done only by the marks suitable for a certain user. Therefore, usability can be improved more than before with regard to a mark for quick reference and playback by the bookmark, the chapter, etc.

Thus, according to the configuration of an embodiment of the invention, a playback method, a program for a playback method, and a recording medium recorded with a program for a playback method thereon, which can improve usability more than before with regard to a mark for quick reference and playback by a bookmark, a chapter, etc.

According to an embodiment of the invention, usability can be improved more than before with regard to a mark for quick reference and playback by a bookmark, a chapter, etc.

BRIEF DESCRIPTION OF THE DRAWINGS

FIG. 7 shows a plan view depicting a bookmark list.

DETAILED DESCRIPTION OF THE INVENTION

Hereinafter, embodiments of the invention will be described in detail with reference to the drawings properly.
Embodiment 1
1. Configuration of Embodiment 1

Figure 2:
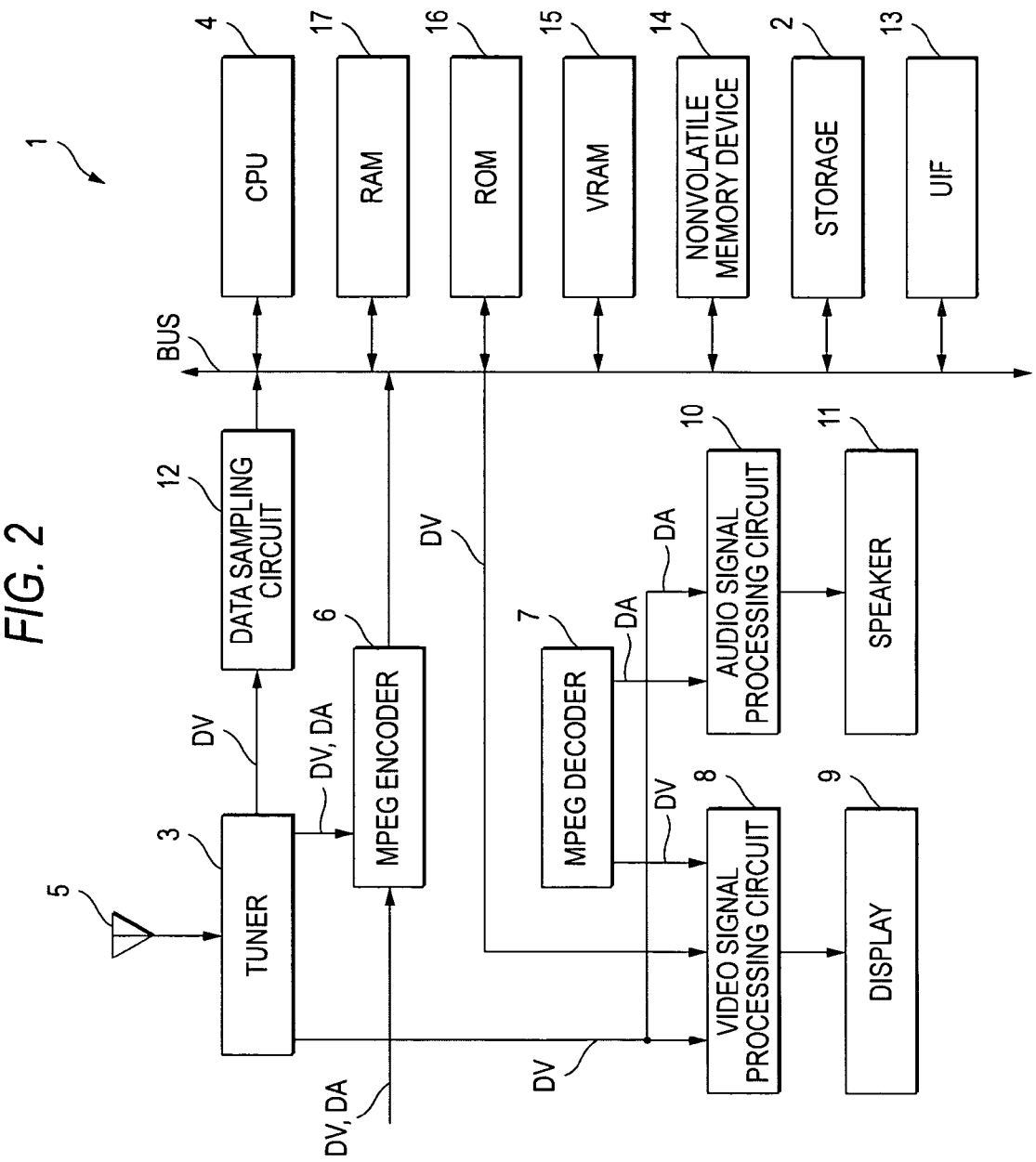
FIG. 2 shows a block diagram depicting the recording/playback apparatus according to an embodiment of the invention.

FIG. 2 shows a block diagram depicting a recording/playback apparatus according to an embodiment of the invention. A recording/playback apparatus 1 records video contents of television broadcasting and video contents through an external input on a recording medium implemented by a storage 2, and plays back video contents recorded on the recording medium for a user. In addition, in the embodiment, an optical disc implemented by a DVD is adapted to the recording medium done by the storage 2, but instead of this, various recording media can be adapted widely such as a memory card and a hard drive.

More specifically, in the recording/playback apparatus 1, a tuner 3 switches operations under control of a central processing unit (the CPU) 4, processes television broadcast waves received by an antenna 5, and outputs video contents of video data DV and audio data DA to an MPEG (Moving Picture Experts Group) encoder 6. In addition, in the case in which the reception of the television broadcast waves is digital broadcasting and like broadcasting, the tuner 3 decodes various items of data of data broadcasting in the broadcast waves, and outputs them to a data sampling circuit 12.

The MPEG encoder 6 compresses video data DV and audio data DA outputted from the tuner 3, or video data DV and audio data DA through an external input inputted via an external input terminal by MPEG techniques for multiplexing under control of the central processing unit 4, and outputs the resulted multiplexed streams to a bus BUS.

In addition, the MPEG encoder 6 further detects an abrupt change in a pixel value between continuous frames of video data DV, and thus detects a scene change from the video data DV. The MPEG encoder 6 notifies the central processing unit 4 of the detection of the scene change, thins out video data DV of the frame in which the scene change is detected, creates image data of a thumbnail image, and outputs the image data of the thumbnail image to the bus BUS.

Under control of the central processing unit 4, the storage 2 acquires multiplexed streams and others outputted to the bus BUS when the video contents are recorded, and records them on the recording medium. Therefore, the recording/playback apparatus 1 records the file of the video contents acquired at the tuner 3 and the file of the video contents through an external input as well as the file associated therewith on the recording medium.

In addition, in playback, the storage 2 plays back the multiplexed stream data and the others recorded on the recording medium, and outputs them to the bus BUS. An MPEG (Moving Picture Experts Group) decoder 7 takes in the multiplexed stream outputted to the bus BUS, decomposes it to the stream data of video data and audio data, and then separately decodes and outputs video data DV and audio data DA.

Under control of the central processing unit 4, a video signal processing circuit 8 selectively takes in the video data DV outputted from the tuner 3, the video data DV outputted from the MPEG decoder 7, or the video data DV outputted from a video RAM (VRAM) 15 via the bus BUS, and drives a display 9 by the selectively inputted video data DV. Thus, the recording/playback apparatus 1 is configured in which it can monitor the pictures of the video contents acquired at the tuner 3 and the pictures of the video contents played back through the storage 2 by the display 9 and can further confirm displays including various menus of manipulations of the recording/playback apparatus 1.

Under control of the central processing unit 4, an audio signal processing circuit 10 selectively takes in audio data DA outputted from the tuner 3 or audio data DA outputted from the MPEG decoder 7, and drives a speaker 11 by the selectively inputted audio data DA. Thus, the recording/playback apparatus 1 is configured in which it can monitor the sounds of the video contents acquired at the tuner 3 and the sounds of the video contents played back through the storage 2 by the speaker 11.

A data sampling circuit 12 extracts and outputs data of an electronic program list, for example, from various items of data of data broadcasting outputted from the tuner 3 to make it available for recording by a timer.

A user interface (UIF) 13 is configured to have an interface of various operators disposed on the recording/playback apparatus 1, a remote command device, an interface which detects manipulations done by the remote command device and other devices, and the user interface 13 notifies the central processing unit 4 of a manipulation done by a user.

Under control of the central processing unit 4, the video RAM 15 stores video data outputted from the central processing unit 4, and outputs the stored video data to the video signal processing circuit 8 via the bus BUS. Thus, the recording/playback apparatus 1 expands images of a menu and others to be displayed on the display 9 to the video RAM 15, and processes them.

The central processing unit 4 is a control part which controls the operation of the recording/playback apparatus 1, and which secures a work area in a random access memory (RAM) 17 in accordance with a read only memory (ROM) 16 and runs a program recorded on a memory, not shown. In addition, in the embodiment, the program for the process of the central processing unit 4 is installed and provided in the recording/playback apparatus 1 in advance. However, instead of provision of installation in advance, it may be provided by downloading via the Internet and others. Alternatively, it may be provided by being recorded on a recording medium such as an optical disc, a magnetic disc, and a memory card.

Therefore, when a user sets the optical disc of a recordable DVD on the storage 2 and instructs recording video contents, the central processing unit 4 controls the tuner 3, the MPEG encoder 6 and the other devices to record the video contents of television broadcasting and the file of the video contents through an external input by the storage 2.

In recording the video contents, when a scene change is detected, the central processing unit 4 sets a bookmark at the place where the scene change is detected, and records and holds the bookmark setting on a nonvolatile memory device 14. In addition, the nonvolatile memory device 14 is configured of a flash memory, for example.

Figure 3:
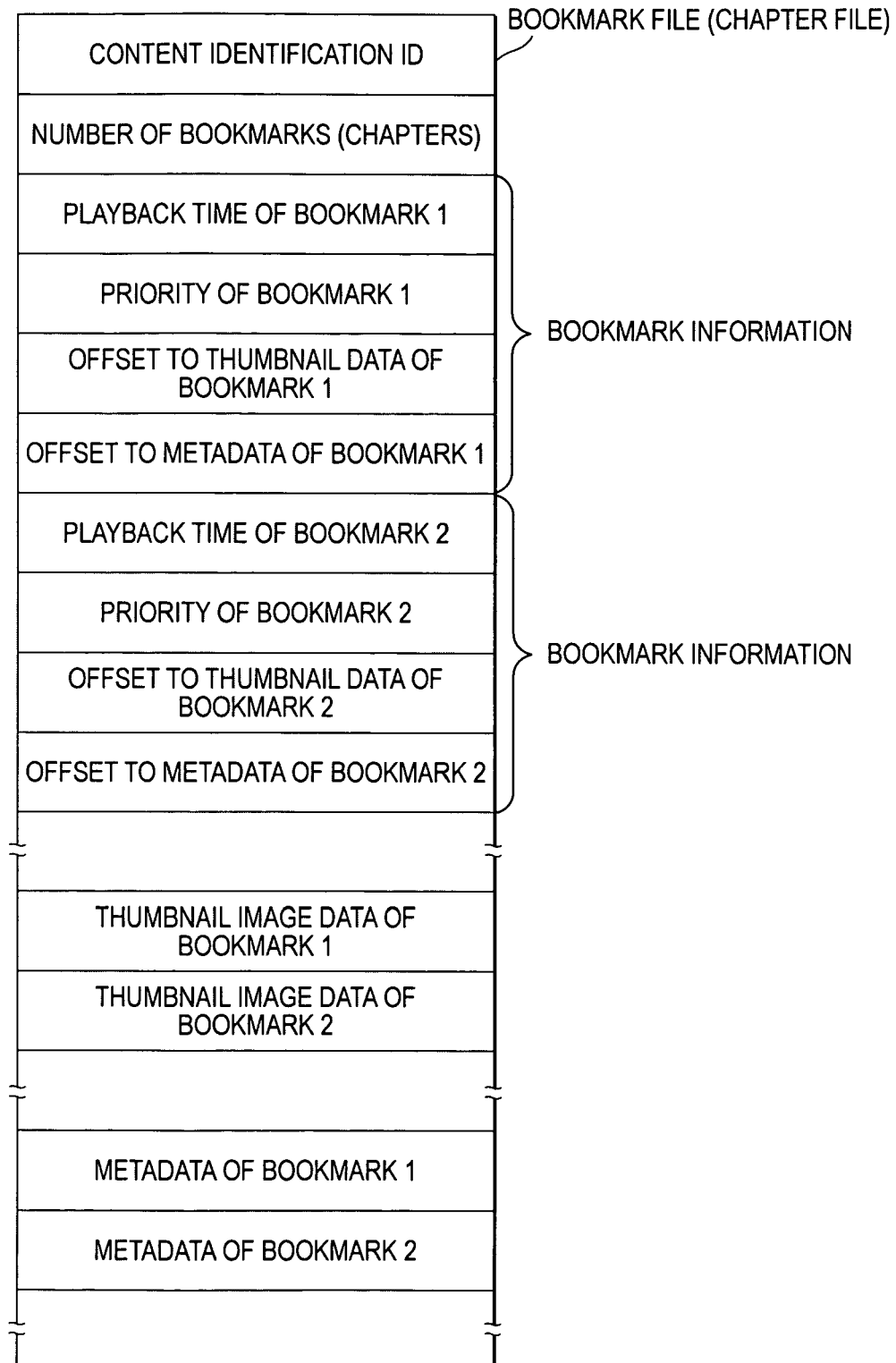
FIG. 3 shows a diagram depicting a bookmark file.

Here, the central processing unit 4 performs recording of the bookmark by a bookmark file in a format shown in FIG. 3. Here, in the bookmark file, a content identification ID is recorded in a beginning field, the content identification ID specifies the corresponding video contents. In addition, in the subsequent field, the number of the bookmarks recorded in the bookmark file is recorded, and information about each of the bookmark is then recorded by the number of the bookmarks recorded in the field.

Here, for information about each of the bookmark, the position information about the corresponding bookmark is recorded in the beginning field with regard to the playback time period from the start of the file of the video contents. In the subsequent field, the priority of the bookmark is recorded. Here, the priority is a parameter which expresses the degree served for quick reference, and the parameter is changed properly depending on processing done by the central processing unit 4, described later. In addition, for information about each of the bookmark, in the subsequent field, position information about thumbnail image data of the corresponding bookmark is recorded with regard to the offset data volume from the start of the bookmark file. In addition, in the subsequent field, position information of metadata of the corresponding bookmark is recorded with regard to the offset data volume from the start of the bookmark file.

In the bookmark file, each of the fields for the content identification ID, the number of the bookmarks, and the bookmark information is formed of a fixed length, and the thumbnail image data of each of the bookmarks and metadata of each of the bookmarks are recorded in a variable length. In addition, here, metadata is data of a name of a bookmark set by a user, a date when the bookmark is set, etc.

On the other hand, when a user instructs the storage 2 to play back a recorded file, the central processing unit 4 switches the entire operation mode to a playback mode and to start the playback of video contents instructed by the user. In this process, the central processing unit 4 instructs the playback of the video contents by normal playback sequentially from the start of the file. When the user instructs a skip, the central processing unit 4 skips the playback part to the subsequent bookmark from the currently playing back part, or to the just previous bookmark in accordance with the record of the corresponding bookmark file.

Figure 4:
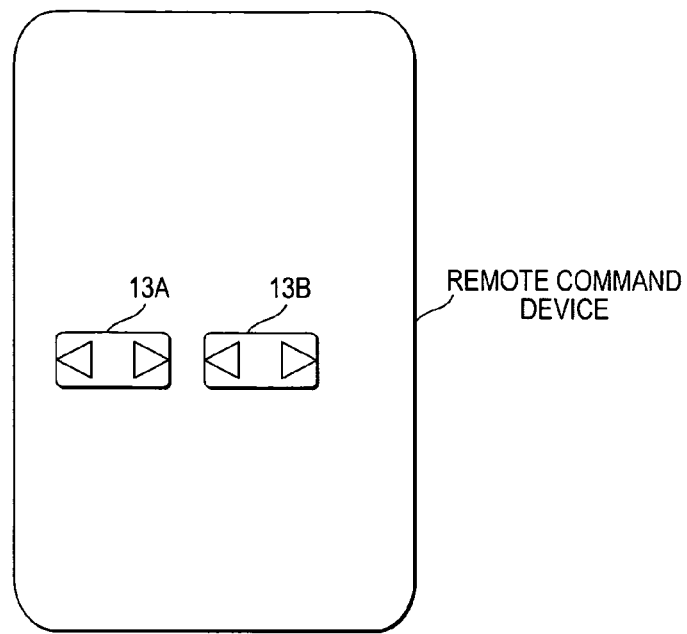
FIG. 4 shows a plan view illustrative of a user interface according to a remote command device.
Figure 5:
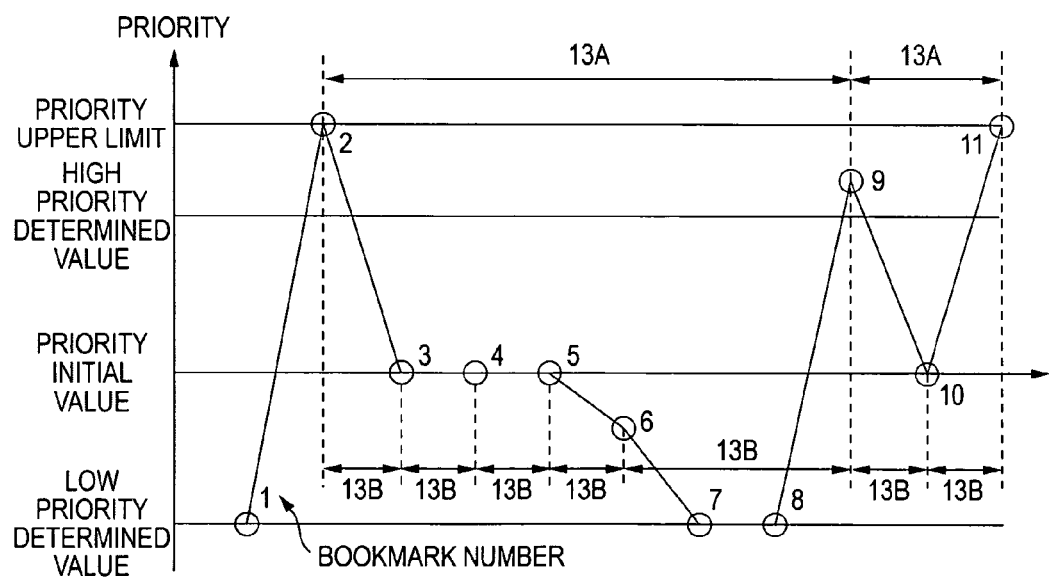
FIG. 5 shows a diagram illustrative of quick reference done by priorities.

More specifically, in the embodiment, as shown in FIG. 4, the remote command device of the user interface 13 is disposed with a skip operator 13A for high priorities which instructs a skip manipulation for bookmarks with high priorities and a skip operator 13B for a normal process which instructs a skip manipulation for normal bookmarks. As shown in FIG. 5, when the skip operator 13A for high priorities is manipulated, the central processing unit 4 selects a bookmark to which a priority equal to or above a high priority determination value is set, and skips the playback part. The high priority determination value is a determination criterion value for higher priorities. More specifically, in the example shown in FIG. 5, the central processing unit 4 performs skip processing in accordance with the bookmarks of bookmark numbers 2, 9, and 11. On the other hand, when the skip operator 13B for the normal process is manipulated, it omits the bookmarks equal to or below a low priority determination value, and skips the playback part. The low priority determination value is a determination criterion value for lower priorities. More specifically, in the example shown in FIG. 5, the central processing unit 4 performs skip processing in accordance with the bookmarks of bookmark numbers 2 to 6 and 9 to 11. In addition, here, the priority initial value is a priority value which is set when the bookmark file is created.

Thus, the central processing unit 4 selects a bookmark served for skip processing in accordance with priorities, and runs the process for quick reference.

Figure 1:
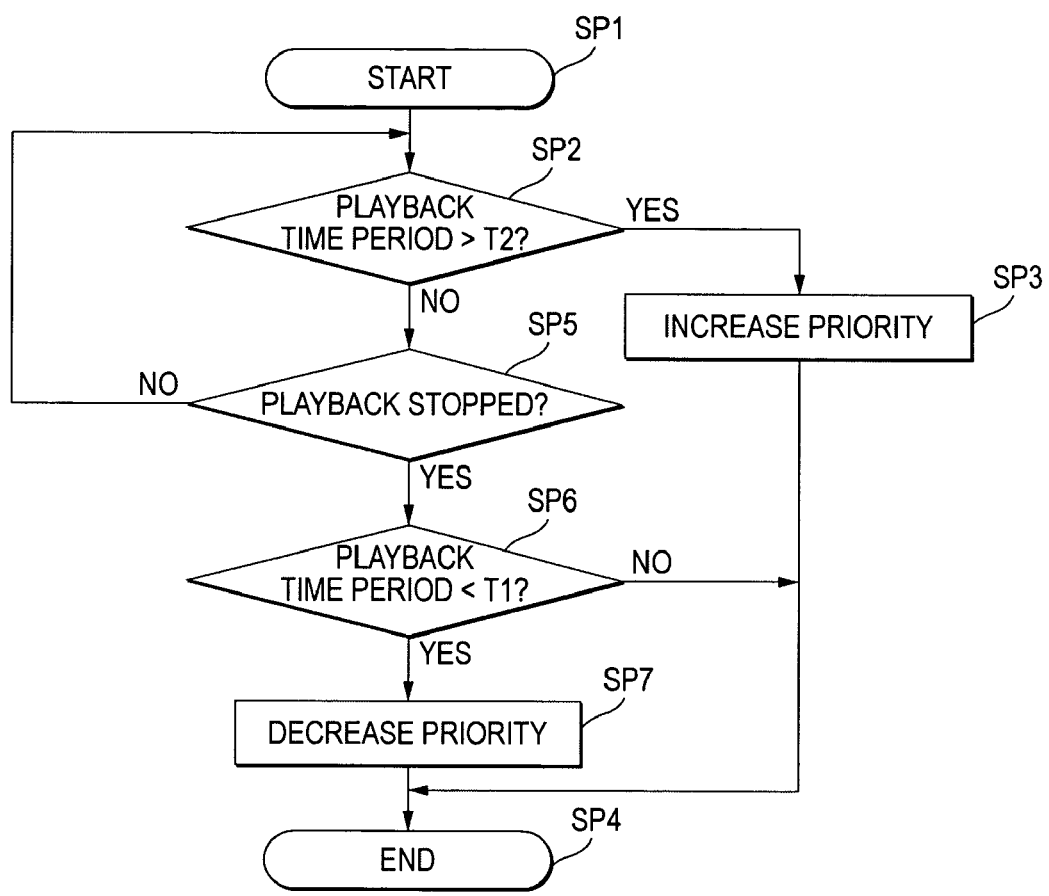
FIG. 1 shows a flow chart depicting process procedures of a central processing unit of a recording/playback apparatus according to an embodiment of the invention.

FIG. 1 shows a flow chart depicting the process procedures of a priority process for skip processing in this manner done by the central processing unit 4. The central processing unit 4 performs the process procedures at every time when it performs the process for quick reference by the manipulation of the skip operators 13A and 13B described above, or every time when a user selects a bookmark from a bookmark list, described later, for the process for quick reference.

More specifically, when the central processing unit 4 starts the process procedures, the process goes from Step SP1 to Step SP2. Here, it determines whether a playback time period from a bookmark by normal playback reaches or exceeds a fixed time period T2 which is used to determine an increase in the priority. Here, when it is positive, the central processing unit 4 moves the process from Step SP2 to Step SP3. It increments the priority of the bookmark served for quick reference by value 1 within the range not exceeding the upper limit value. Then, the process goes to Step SP4 to end the process procedures.

On the other hand, when it is negative at Step SP2, the central processing unit 4 moves the process from Step SP2 to Step SP5. It determines whether the normal playback is stopped by subsequent manipulation of the skip operator 13A or 13B. When it is negative here, the process returns to Step SP2. On the other hand, when it is positive at Step SP5, the central processing unit 4 moves the process from Step SP5 to Step SP6. Here, it determines whether the playback time period by normal playback is equal to or below a playback time period T1 which is used to determine a decrease in the priority.

Here, when it is positive, the central processing unit 4 moves the process from Step SP6 to Step SP7. It decreases the priority from value 1. After that, the process goes to Step SP4 to end the process procedures. On the other hand, when it is negative at Step SP6, no priority is changed in this case, and the process goes from Step SP6 to Step SP4 to end the process procedures.

Figure 6:
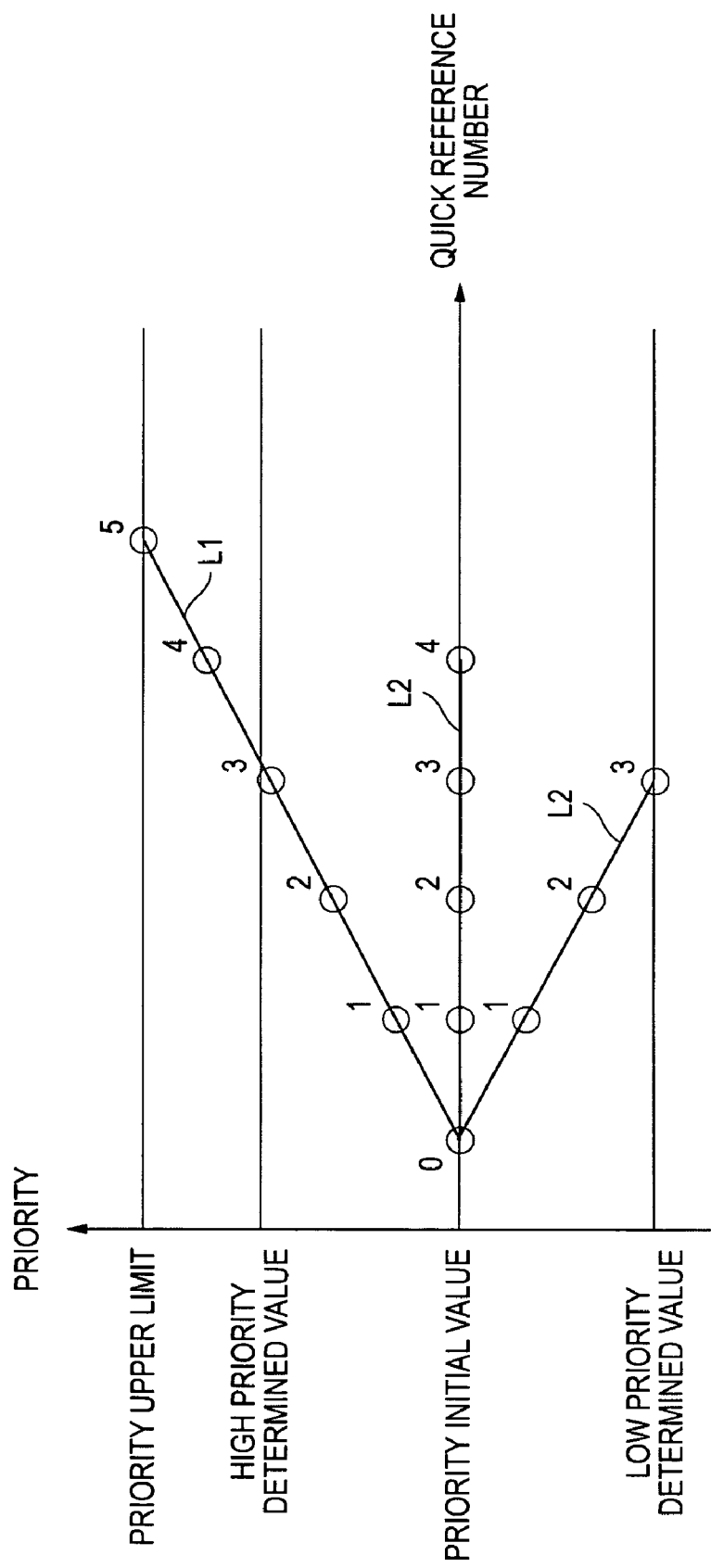
FIG. 6 shows a diagram illustrative of priority change.

Thus, as shown in FIG. 6, in the case in which the video contents are played back by normal playback from the portion at which a quick reference is made for a fixed time period or longer at every time when the video contents are viewed for many times for the quick reference process to fined the start of the video contents, as indicated by symbol L1, the priority is increased up to the upper limit value at every time for quick reference. On the other hand, when a quick reference is made to instantaneously skip to the subsequent bookmark, as indicated by symbol L2, the priority is deceased at every time for quick reference. In addition, in this case, as described above in FIG. 5, when the priority is equal to or below the low priority determination value, the priority is held in the low priority determination value since the central processing unit 4 does not perform the process for quick reference even though the skip operator 13B is manipulated. On the other hand, a quick reference is made to skip to the bookmark to which normal playback follows within the time period T2 even though it is at the degree not decreasing the priority, as indicated by symbol L3, the priority is held to the initial value. In addition, instead of an increase or decrease in the priority by value 1 in this manner, the value to increase and the value to decrease may be varied in accordance with the playback time period by normal playback.

Accordingly, in this manner, the central processing unit 4 changes the priority of the bookmark in the bookmark file recorded on the nonvolatile memory device 14 at every time when it runs the process for quick reference.

On the other hand, when a user instructs showing the bookmark list during the playback of the video contents in this manner, the central processing unit 4 drives the video RAM 15 to switch the display of the display 9 to the bookmark list as shown in FIG. 7. Here, the bookmark list is displayed in such a way that the bookmarks recorded in the bookmark file are sequentially displayed from the top. In addition, for representation of each of the bookmarks, the total number of set bookmarks, playback time, and date of the bookmark set by metadata are displayed. In addition, in this case, when a name of the bookmark is recorded in the bookmark file by metadata, the central processing unit 4 as well displays this name. In addition, when a user instructs representation of the bookmark in a thumbnail image by user manipulation, the central processing unit 4 represents the thumbnail image by the corresponding thumbnail image data for listing the bookmarks instead of the bookmarks by text.

In this representation, the central processing unit 4 represents the bookmark having a priority equal to or above the high priority determination value in such a way that it sets a background color more noticeable than the other bookmarks for display as indicated by symbol F1, thereby drawing user's attention. In addition, contrary to this, for the bookmark having the priority of the low priority determination value, as indicated by symbol F2, it sets a background color less noticeable than the other bookmarks for display. In addition, instead of setting a background like this, representation may be switched such as by putting a border on the edge. In addition, in listing the thumbnail images, a thumbnail image having a priority of the low priority determination value is represented in a pale one. In representation of them, various representation methods can be adapted.

In addition, in this representation, when the user manipulates the remote command device to move a cursor K, the central processing unit 4 accepts a bookmark selection by the user, finds the start of a sequence with the bookmark selected by the user, and plays back the video contents. In a series of these processes, the central processing unit 4 skips the cursor K for the bookmarks having a priority of the low priority determination value for preventing the acceptance of user selection.

On the other hand, when the user mounts an optical disc of a DVD of a package medium to instruct the playback of video contents, the central processing unit 4 creates a chapter file as similar to the bookmark file described above in FIG. 3 based on chapters of the video contents instructed for playback. In addition, in the bookmark file, the thumbnail image data is provided to the bookmark file and position information about the corresponding thumbnail image data is assigned to information about each of the bookmark. However, instead of this, for the chapter file, recording thumbnail image data on the chapter file may be omitted for setting a link to the optical disc.

The central processing unit 4 further performs a series of processes for the bookmark file by the chapter file thus created from the chapters, and thus it runs the process for quick reference while it is properly updating priorities. In addition, it holds the chapter file in the nonvolatile memory device 14 for a fixed period or until the area of the nonvolatile memory device 14 is short even after the playback of the video contents is finished, or after the optical disc is ejected. When the optical disc is again mounted, it uses the chapter file held in the nonvolatile memory device 14 to run the process for quick reference while it is properly updating priorities.

2. Operation of Embodiment 1

In the configuration above, in the recording/playback apparatus 1 (FIG. 2), for the video contents from the video contents of television broadcasting, they are received at the tuner 3, data of video data DV and audio data DA is compressed by the MPEG encoder 6 for multiplexing, and then it is recorded on the recording medium by the storage 2. In addition, when the video contents through an external input are recorded, data of video data DV and audio data DA through an external input is compressed by the MPEG encoder 6 for multiplexing, and then it is recorded on the recording medium by the storage 2.

In recording the video contents, bookmarks are sequentially set to the video contents by detecting a scene change. Position information about the bookmark is recorded in the bookmark file (FIG. 3) as well as thumbnail image data and metadata of the bookmarks on the nonvolatile memory device 14. The nonvolatile memory device 14 is a recording medium different from the recording medium on which the video contents are recorded.

Therefore, in the embodiment, when many bookmarks are set under the conditions not so tight for scene change detection so that all users can use the bookmarks, a lot of undesirable bookmarks are to be set, thereby causing deterioration of user usability. In addition, on contrary to this, when the conditions are set tightly for scene change detection to reduce the number of set bookmarks, desired bookmarks might not be set, thereby causing deterioration of usability.

On this account, in the embodiment, a priority is set to each of the bookmarks thus recorded in the bookmark file, and the priority is set to the initial set value in creating a bookmark file. In addition, the priority is varied by quick reference operation with the use of the bookmarks, and the bookmark having a low priority is set in such a way that quick reference operation by a user is not accepted (FIGS. 1, 5 and 6).

Therefore, in the embodiment, a number of bookmarks are set so as to be available for all the users, and a priority is increased only in desired bookmarks to accept manipulations. Finally, a user can make quick reference and playback only by the bookmarks suitable for that user. Thus, usability can be improved more than before with regard to the bookmark.

More specifically, in the recording/playback apparatus 1, when a quick reference is made and video contents are not played back by normal playback for a fixed time period or longer related to determination of a decrease in the priority, the priority of the corresponding bookmark is decreased for quick reference. Thus, when this event is repeated in which a quick reference is made to instantaneously skip to the subsequent bookmark, the priority of the bookmark is gradually decreased, and this bookmark is not used for quick reference in the end. Therefore, the bookmarks undesirable for a user are not used for quick reference, and thus user usability can be improved.

On the other hand, when this event is repeated in which a quick reference is made to play back video contents by normal playback for a fixed time period or longer related to determination of an increase in the priority, the bookmark is a bookmark used for quick reference by a user, ands thus the priority of the corresponding bookmark is increased. Therefore, the priority is gradually increased for the bookmark frequently used for quick reference, a quick reference is made with regard to the increased priority, and thus user usability can be improved.

More specifically, in the recording/playback apparatus 1, two types of the skip operators 13A and 13B are provided in the remote command device (FIG. 4). When the skip operator 13B is manipulated, skip processing is done by the bookmark having a priority that is equal to a predetermined value or is not decreased thereto, whereas when the skip operator 13A is manipulated, skip processing is done by the bookmark having a priority that is increased to a fixed value or greater.

Therefore, in the embodiment, the bookmark used for quick reference for many times can be utilized to run the process for quick reference, and usability can be improved correspondingly. In addition, two types of the skip operators 13A and 13B for bookmarks are disposed. Thus, this scheme may be done in which a quick reference is roughly made for high priorities by the skip operator 13A and then a quick reference is made for low priorities by the skip operator 13B in finer steps, thereby allowing usability to be improved correspondingly.

In addition, even though the user instructs showing the bookmark list (FIG. 7), the bookmarks are listed as those having higher priorities can be distinguished from those having lower priorities, and thus usability can be improved as well.

As described above, in the embodiment, the bookmark file is recorded in the nonvolatile memory device 14 which is a recording medium different from the recording medium on which the video contents are recorded. In addition, when an optical disc of a package medium is played back, a chapter file as similar to the book mark file is created from chapters set to the video contents to be played back on the optical disc, and is recorded in the nonvolatile memory device 14. Similarly, the priorities in the chapter file of the nonvolatile memory device 14 are properly changed, and a manipulation done by a user is accepted. Therefore, in the embodiment, also with regard to the chapter, user usability can be improved more than before as similar to the bookmark in recording the video contents.

As described above, in this case, in the chapter file, the correspondence with the video contents is recorded by the content identification ID, and is held in the nonvolatile memory device 14. When the optical disc having the video contents is ejected from the recording/playback apparatus 1 and the optical disc having the video contents is later played back, the process for quick reference is run by the chapter file held in the nonvolatile memory device 14, and thus user usability can be improved.

3. Advantage of Embodiment 1

According to the configuration above, priorities are set to the bookmark and the chapter which are marks for quick reference, and are updated. For those having lower priorities, a manipulation done by a user is not accepted. With regard to a mark for quick reference and playback by the bookmark and the chapter, usability can be improved more than before.

At this time, when a quick reference is made and then the video contents are not played back by normal playback for a fixed time period or longer related to determination of a decrease in the priority, the priority is decreased not to allow a mark to be used for quick reference, that mark is a mark that is not used for quick reference at all. Correspondingly, usability can be improved.

In addition, when a quick reference is made and then the video contents are played back by normal playback for a fixed time period or longer related to determination of an increase in the priority, the priority is increased to raise the priority for a mark actually used for quick reference for many times. An increase in the priority is effectively used to improve user usability.

In addition, the priority is recorded and held in the recording medium different from the recording medium on which the video contents are recorded. Thus, for both the video contents provided by a playback only recording medium and the video contents provided by a recording medium that can be recorded and played back, usability can be improved more than before with regard to a mark for quick reference and playback by the bookmark and the chapter.

Embodiment 2

In addition, in the embodiment described above, this case is described in which the bookmark having a priority decreased to a fixed value or below is set so as not to accept a manipulation done by a user as it is still held in the bookmark file, but the invention is not limited thereto. A manipulation done by a user may not be accepted by deleting a mark from the bookmark file.

In addition, in the embodiment described above, this case is described in which the bookmark file is created integrally with thumbnail image data and metadata, but the invention is not limited thereto. Thumbnail image data and metadata may be separately recorded in different files.

In addition, in the embodiment described above, this case is described in which the bookmarks are categorized into three categories in accordance with priorities and are assigned to manipulations of two type of the skip operators, but the invention is not limited thereto. For the number of categories for bookmarks in accordance with priorities, this scheme may be done in which the bookmarks are categorized into any numbers of categories as necessary to accept a manipulation done by a user. In addition, instead of assignment to two types of the skip operators like this, the assignment of a bookmark may be switched depending on the difference in time periods made by pressing a single skip operator.

In addition, in the embodiment described above, this case is described in which the bookmarks are recorded on the recording medium different from the recording medium on which the video contents are recorded, but the invention is not limited thereto. The bookmarks may be recorded on a recording medium the same as the recording medium on which the video contents are recorded. When this is done, also in the case of viewing the video contents on another playback apparatus, settings of the bookmarks and priorities are used to improve user usability. In addition, in this case, the bookmarks may be recorded in the file of the video contents. When this is done, in the case in which the file of the video contents is transmitted over a network and used by another playback apparatus, settings of the bookmarks and priorities are used to improve user usability.

In addition, in the embodiment described above, this case is described in which the invention is adapted to the playback of the recorded video contents recorded on the recording medium, but the invention is not limited thereto, which may be adapted to a playback apparatus for video contents distributed over a network. More specifically, in this case, a bookmark file is acquired from a distributor of the video contents, the bookmark file in which priorities have initial values and held in the playback apparatus. By such manipulations as skip and playback in the playback apparatus, the distributor is instructed to skip or distribute the video contents on demand as well as the priorities are updated. Thus, also in the case of the video contents distributed over a network, user usability can be improved as similar to the embodiment described above.

In addition, in the embodiment described above, this case is described in which the bookmark is automatically set in accordance with the detection of the scene change for the video contents of television broadcasting and the video contents through an external input, but the invention is not limited thereto, for example, which may also be widely adapted to such the case in which the bookmark is automatically set depending on fixed time intervals. In addition, the invention may also be widely adapted to such the case in which the bookmark is set in accordance with user manipulation.

In addition, in the embodiment described above, this case is described in which the invention is adapted to the process for the mark for quick reference and playback by the bookmark and the chapter, but the invention is not limited thereto, which may be widely adapted to a process for a mark for quick reference and playback other than the bookmark and the chapter.

In addition, in the embodiment described above, this case is described in which the invention is adapted to the playback of the video contents, but the invention is not limited thereto, which may also be widely adapted to playback of music contents.

The invention can be adapted to the recording/playback apparatus which records and plays back a piece of programming of television broadcasting with an optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. A playback apparatus which plays back video contents or music contents, the playback apparatus comprising:
   a playback unit which plays back the video contents or the music contents recorded on a recording medium; and
   a control unit which controls at least a playback operation of the playback unit,
   wherein in the video contents or the music contents, a mark for quick reference for playback is set at a plurality of places,
   in response to a manipulation for playback performed by a user, the control unit finds a start of a sequence in accordance with the mark for quick reference for playback to control the playback operation of the playback unit so as to play back the video contents or the music contents,
   in response to a manipulation for playback performed by the user with regard to the quick reference for playback, the control unit varies a priority that expresses a degree served for the quick reference for playback, and
   for the mark for quick reference for playback having a priority lower than a predetermined degree, the control unit does not accept a quick reference manipulation for playback performed by the user.

2. A playback method of video contents or music contents in which the video contents or the music contents have a mark for quick reference for playback that is set at a plurality of places, the playback method comprising the steps of:
   a content playback step which finds a start of a sequence in accordance with the mark for quick reference for playback and plays back the video contents or the music contents in response to a manipulation for playback performed by a user, and
   a priority varying step which varies a priority that expresses a degree served for the quick reference for playback in response to a manipulation for playback performed by the user with regard to the quick reference for playback,
   wherein in the content playback step, a quick reference manipulation for playback performed by the user is not accepted for the mark for quick reference for playback having a priority lower than a predetermined degree.

3. The playback method according to claim 2, wherein in the priority varying step, after a quick reference for playback is made in accordance with the mark for quick reference for playback, the priority for the mark for quick reference for playback is decreased when the video contents or the music contents are not played back by normal playback for a fixed time period or longer related to determination of a decrease in the priority.

4. The playback method according to claim 2, wherein in the priority varying step, after a quick reference for playback is made in accordance with the mark for quick reference for playback, the priority for the mark for quick reference for playback is increased when the video contents or the music contents are played back by normal playback for a fixed time period or longer related to determination of an increase in the priority.

5. The playback method according to claim 2, comprising the step of recording the priority in which the priority is recorded on a recording medium recorded the video contents or the music contents.

6. The playback method according to claim 5, wherein in the priority recording step, the priority is recorded in a file of the video contents or the music contents.

7. The playback method according to claim 2, comprising the step of recording the priority on a recording medium different from a recording medium on which the video contents or the music contents are recorded as the priority is associated with the corresponding video contents or the corresponding music contents.

8. A non-transitory computer-readable storage medium having instructions recorded thereon, when executed on a computer system, performs a playback method which plays back video contents or music contents by running process procedures performed by an operating processing module,
   wherein the video contents or the music contents have a mark for quick reference for playback that is set at a plurality of places, and
   the process procedures include the steps of:
      finding a start of a sequence in accordance with the mark for quick reference for playback and playing back the video contents or the music contents in response to a manipulation for playback performed by a user, and
      varying a priority that expresses a degree served for the quick reference for playback in response to a manipulation for playback performed by the user with regard to the quick reference for playback,
      wherein a quick reference manipulation for playback performed by the user is not accepted for the mark for quick reference for playback having a priority lower than a predetermined degree.

9. An information processing apparatus comprising:
   a control unit controlling at least a playback operation of a playback unit which plays back video contents or music contents, and
   acquiring unit acquiring data of a mark for quick reference for playback to a place in the video contents or the music contents;
   wherein the control unit finds a start of a sequence in accordance with the mark for quick reference for playback to control the playback operation of the playback unit so as to play back the video contents or the music contents,
   in response to a manipulation of the quick reference for playback performed by a user, the control unit varies a priority that expresses a degree served for the quick reference for playback, and
   for the mark for quick reference for playback having a priority lower than a predetermined degree, the control unit does not accept a quick reference manipulation for playback performed by the user.

* * * * *